United States Patent
Tracht et al.

(10) Patent No.: US 7,334,811 B2
(45) Date of Patent: Feb. 26, 2008

(54) VEHICLE SEAT ASSEMBLY WITH SPACED AIR BAG GUIDE RETAINERS

(75) Inventors: Michael L. Tracht, Ingolstadt (DE); Mathias Klemm, Grobenzell (DE)

(73) Assignee: Lear Corporation, Southfield, MI (US)

(*) Notice: Subject to any disclaimer, the term of this patent is extended or adjusted under 35 U.S.C. 154(b) by 375 days.

(21) Appl. No.: 10/904,835

(22) Filed: Dec. 1, 2004

(65) Prior Publication Data

US 2006/0113762 A1    Jun. 1, 2006

(51) Int. Cl.
B60R 21/20    (2006.01)

(52) U.S. Cl. .............. 280/728.3; 280/730.1; 280/730.2

(58) Field of Classification Search ........... 280/728.2, 280/728.3, 730.1, 730.2, 732; 297/216.13, 297/216.12
See application file for complete search history.

(56) References Cited

U.S. PATENT DOCUMENTS

| | | | |
|---|---|---|---|
| 5,498,030 A * | 3/1996 | Hill et al. ............. | 280/743.1 |
| 5,667,242 A | 9/1997 | Slack et al. | |
| 5,749,597 A | 5/1998 | Saderholm | |
| 5,762,363 A * | 6/1998 | Brown et al. ........... | 280/730.2 |
| 5,799,970 A | 9/1998 | Enders | |
| 5,799,971 A | 9/1998 | Asada | |
| 5,810,389 A | 9/1998 | Yamaji et al. | |
| 5,816,610 A | 10/1998 | Higashiura et al. | |
| 5,860,673 A | 1/1999 | Hasegawa et al. | |
| 5,890,734 A | 4/1999 | Saderholm | |
| 5,893,579 A | 4/1999 | Kimura et al. | |
| 5,897,134 A | 4/1999 | Stein et al. | |
| 5,927,749 A | 7/1999 | Homier et al. | |
| 5,938,232 A | 8/1999 | Kalandek et al. | |
| 5,967,546 A | 10/1999 | Homier et al. | |
| 6,007,091 A | 12/1999 | Westrich | |
| 6,045,151 A | 4/2000 | Wu | |
| 6,179,324 B1 | 1/2001 | White et al. | |
| 6,206,410 B1 * | 3/2001 | Brown ................. | 280/728.3 |
| 6,237,934 B1 | 5/2001 | Harrell et al. | |
| 6,293,580 B1 * | 9/2001 | Lachat et al. ........... | 280/728.3 |
| 6,352,304 B1 * | 3/2002 | Sorgenfrei ............ | 297/216.13 |
| 6,386,577 B1 | 5/2002 | Kan et al. | |

(Continued)

FOREIGN PATENT DOCUMENTS

DE    103 07 480 A1    9/2004

(Continued)

*Primary Examiner*—Eric Culbreth
*Assistant Examiner*—Toan C. To
(74) *Attorney, Agent, or Firm*—Brooks Kushman P.C.

(57) ABSTRACT

In at least certain embodiments, the vehicle seat assembly comprises a frame, a seat pad, a trim cover including a first and second end adjacent each other to form a release seam, and an air bag assembly mounted on the frame. In accordance with this embodiment, the air bag assembly includes an inflator and air bag that is inflatable to project outwardly from the seat through the air bag release seam. Further in accordance with this embodiment, the vehicle seat assembly further includes an air bag guide including an inner panel and an outer panel, a first member extending between and connecting the first end of the trim cover and the inner panel, a second member connecting the second end of the trim cover and the outer panel, and a connector engaged with and connecting the first member with the second member.

20 Claims, 3 Drawing Sheets

U.S. PATENT DOCUMENTS

| | | |
|---|---|---|
| 6,450,528 B1 | 9/2002 | Suezawa et al. |
| 6,457,741 B2 | 10/2002 | Seki et al. |
| 6,588,838 B1 | 7/2003 | Dick, Jr. et al. |
| 7,004,496 B2* | 2/2006 | Bossecker et al. ....... 280/730.2 |
| 7,134,685 B2* | 11/2006 | Panagos et al. .......... 280/730.2 |
| 2004/0195028 A1 | 10/2004 | Feldman |
| 2006/0113752 A1* | 6/2006 | Tracht ..................... 280/728.2 |
| 2006/0113761 A1* | 6/2006 | Tracht ..................... 280/730.2 |

FOREIGN PATENT DOCUMENTS

| | | |
|---|---|---|
| EP | 0 782 944 A | 7/1997 |
| FR | 2 806 685 A1 | 9/2001 |
| GB | 2 410 011 A | 7/2005 |
| WO | WO 00/06426 | 2/2000 |

* cited by examiner

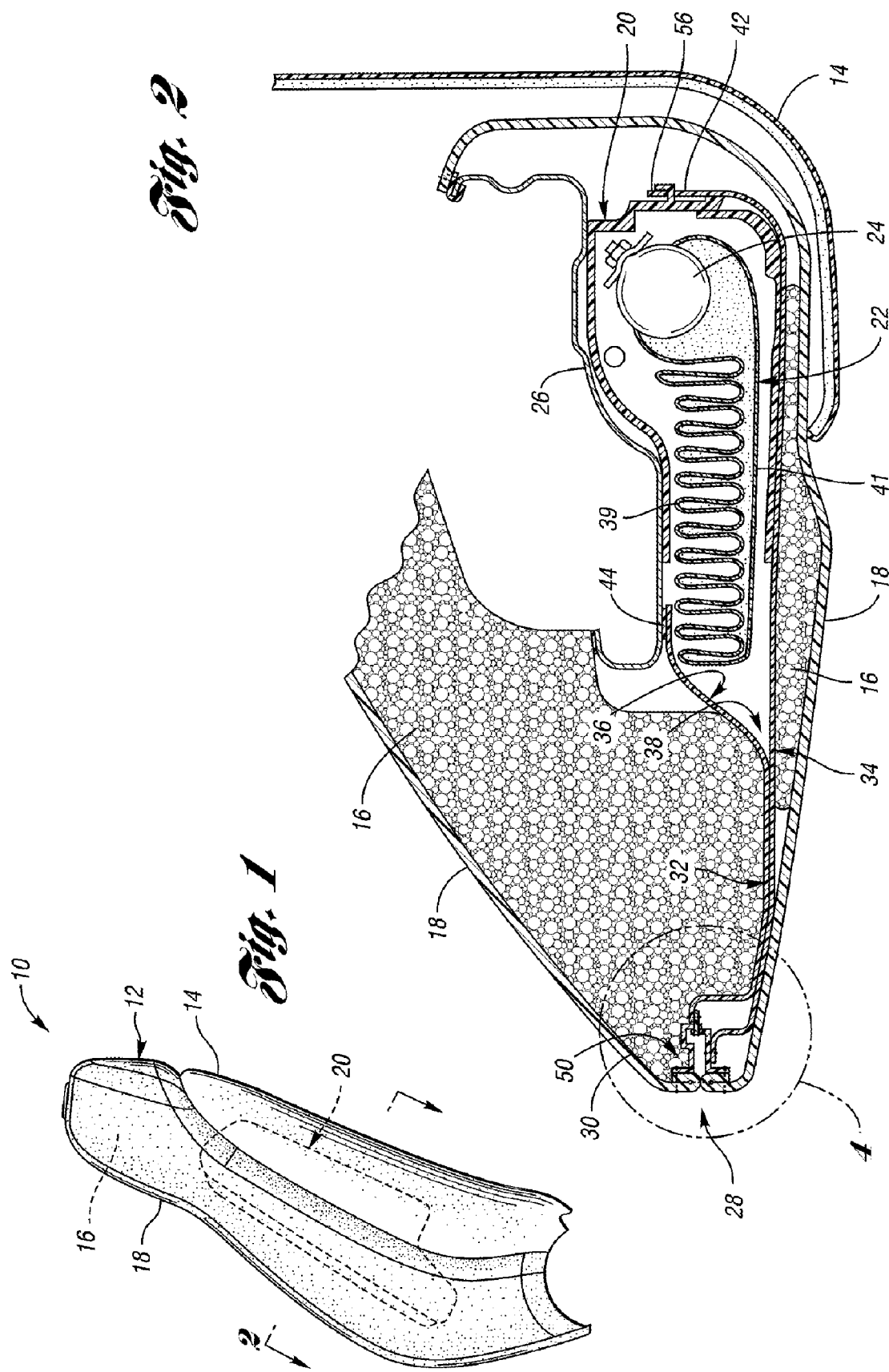

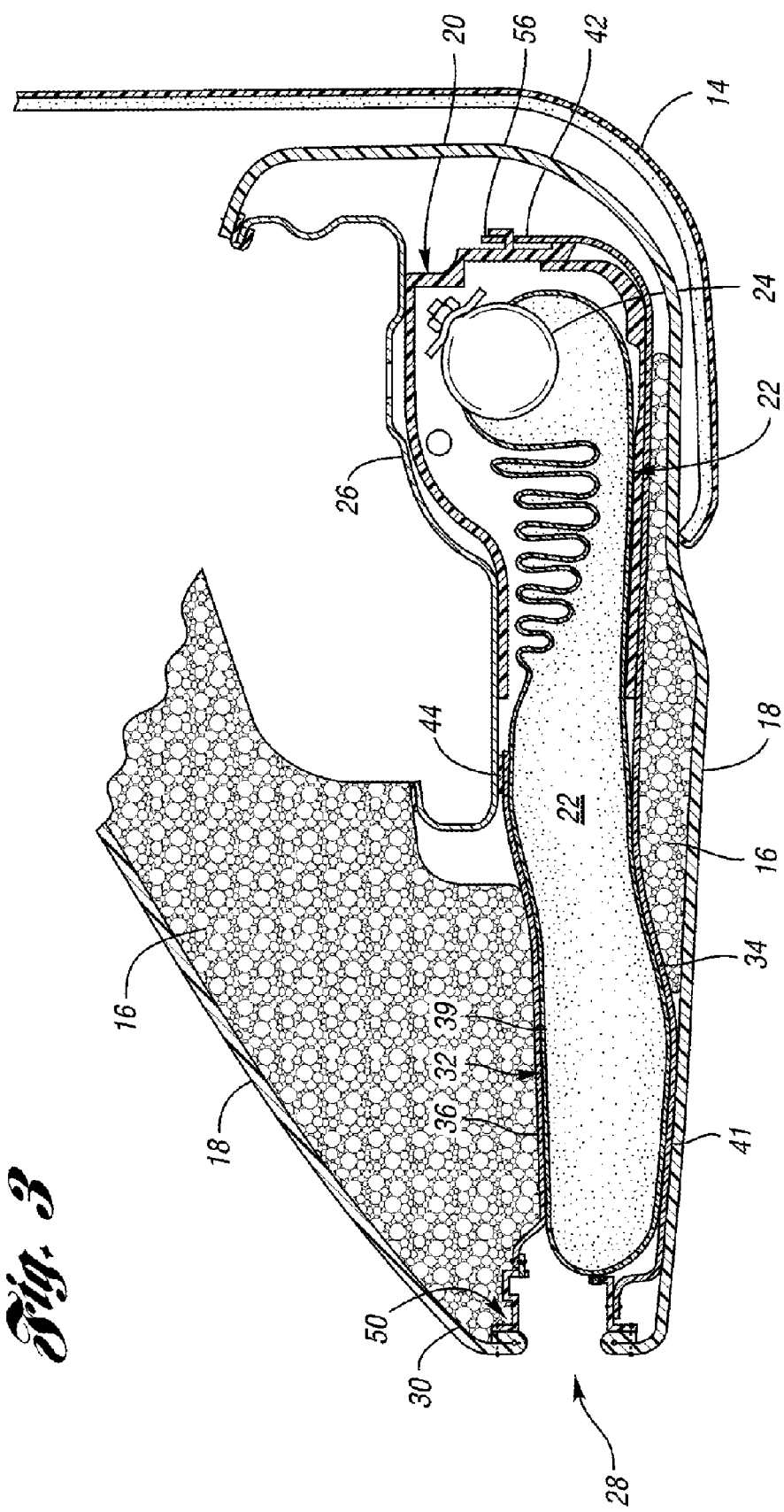

VEHICLE SEAT ASSEMBLY WITH SPACED AIR BAG GUIDE RETAINERS

BACKGROUND OF THE INVENTION

1. Field of the Invention

The present invention relates to a vehicle seat assembly, and in particular, a seat assembly including an air bag.

2. Background Art

Vehicles can be equipped with side air bags, which may be in the form of a side air curtain disposed in a headliner of the vehicle, or alternatively, may be an air bag disposed within a vehicle seat assembly. One limitation of air bags that are located within a seat assembly, is that the air bag needs to break through the seating material before it can fully deploy to protect a vehicle occupant. During deployment, such an air bag may encounter foam, or other seat pad materials, and must then break through a seat trim cover in order to escape from the seat assembly. Another limitation is that the air bag should break through the cover material at a predetermined location to optimize effectiveness.

Prior vehicle seat assemblies equipped with side air bags and manufacturing methods are disclosed in U.S. Pat. Nos. 5,816,610, 5,860,673, 5,938,232, 6,045,151, 6,237,934 and 6,588,838, for example.

SUMMARY OF THE INVENTION

Under the invention, a vehicle seat assembly is provided. In at least one embodiment, the vehicle seat assembly comprises a frame, a seat pad adjacent the frame, a trim cover extending over the seat pad and including a first and second end adjacent each other to form a release seam adjacent the seat pad, and an air bag assembly mounted on the frame within the trim cover in a spaced relationship from the air bag release seam. In accordance with this embodiment, the air bag assembly includes an inflator and a folded air bag that is inflated by the inflator to unfold and project outwardly from the seat through the air bag release seam of the trim cover. Further in accordance with this embodiment, the vehicle seat assembly further includes an air bag guide including an inner panel and an outer panel that are each made of flexible material and have outer extremities, a first member extending between and connecting the first end of the trim cover and the outer extremity of the inner panel, a second member connecting the second end of the trim cover and the outer extremity of the outer panel, and a connector engaged with and connecting the first member with the second member.

In at least one embodiment, the first member, the second member, and the connector are made of rigid plastic. In yet another embodiment, the first member has a first opening, the second member has a second opening, and the connector extends through the first and second openings.

In at least another embodiment, the connector is connected to the outer panel. In still yet at least another embodiment, stitching connects the first member to the inner panel and the connector to the outer panel.

In still yet another embodiment, the second member is connected to the outer panel by stitching and stitching connects the first member to the inner panel.

In yet at least another embodiment, the vehicle seat assembly comprise a frame, a seat pad adjacent the frame, and a trim cover extending over the seat pad that includes a release seam adjacent the seat pad. In this embodiment, the seat assembly further comprises an air bag assembly within the trim cover in a spaced relationship from its air bag release seam, with the air bag assembly including an inflator and a folded air bag that is inflated by the inflator to unfold and project outwardly from the seat through the air bag release seam of the trim cover. In this embodiment, the seat assembly also further comprises an air bag guide including an inner panel and an outer panel, a first member connecting the trim cover with the inner panel, a second member connecting the trim cover with the outer panel, and a connector connecting the first member with the second member.

In still yet at least another embodiment, the vehicle seat assembly comprises a frame, a seat pad mounted on the frame, a trim cover extending over the seat pad and including a release seam adjacent the seat pad, with the release seam being formed by a first and a second end of the trim cover, and an air bag assembly mounted on the frame within the trim, with the air bag assembly including an inflator and an air bag that is inflated by the inflator to project outwardly from the seat through the air bag release seam of the trim cover. In this embodiment, the seat assembly further comprises an air bag guide including a first panel and a second panel, a rigid first plastic member extending between and connecting the first end of the trim cover and the first panel, a rigid second plastic member connected to the second end of the trim cover, and a rigid plastic connector pin extending between and connecting the first member and the second member.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 1 is a fragmentary side view of a portion of a seat assembly in accordance with the present invention;

FIG. 2 is a fragmentary sectional view of the seat assembly shown in FIG. 1, taken through line 2-2;

FIG. 3 is a view similar to FIG. 2 showing the parts in a different position;

DETAILED DESCRIPTION OF THE PREFERRED EMBODIMENT(S)

Figure 4:
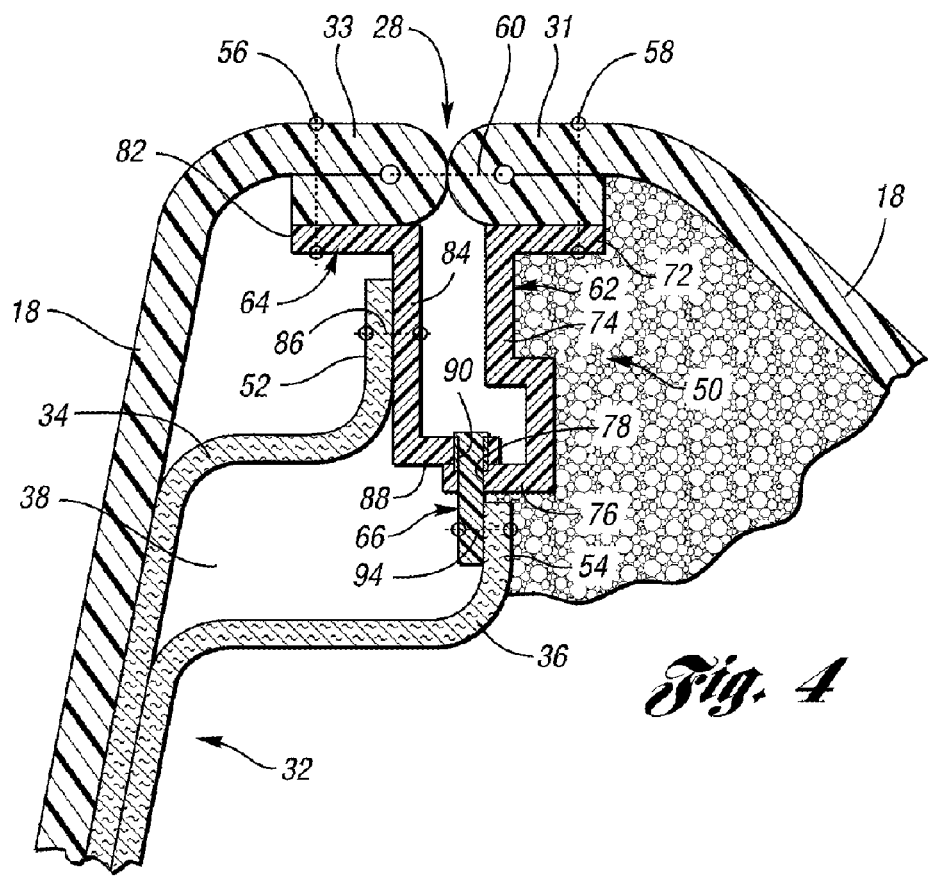
FIG. 4 is a fragmentary sectional view of a detail of the seat assembly shown in FIG. 2.

As required, detailed embodiments of the present invention are disclosed herein. However, it is to be understood that the disclosed embodiments are merely exemplary of the invention that may be embodied in various alternative forms. The figures are not necessarily of scale, some features may be exaggerated or minimized to show details of particular components. Therefore specific structural and functional details disclosed herein are not to be interpreted as limiting, but merely as a representative basis for the claims and/or a representative basis for teaching one skilled in the art to variously employ the present invention.

Moreover, except where otherwise expressly indicated, all numerical quantities in this description and in the claims indicating amounts of materials or conditions of reactions and/or use are to be understood as modified by the word "about" in describing the broader scope of this invention. Practice within the numerical limits stated is generally preferred. Also, unless expressly stated to the contrary, the description of a group or class of materials as suitable preferred for a given purpose in connection with the invention implies that mixtures of any two or more members of the group or class may be equally suitable or preferred.

FIG. 1 shows a portion of a seat assembly 10 in accordance with the present invention. The seat assembly 10 includes a seat back 12, and seat pad 16 covered by a trim cover 18. As is well known, the seat assembly 16 includes a seat bottom (not shown). The trim cover 18 may be made of any suitable material such as cloth, vinyl or leather, etc. As is shown in FIG. 1, in at least some embodiments, a relatively rigid plastic molding 14 can be provided in the rear area of the seat assembly 10 to provide support and/or for aesthetics.

In at least one embodiment, the seat pad 16 is made from a molded polymeric material, such as a polyurethane foam. The use of a polymeric foam material to construct the seat pad 16 can be cost effective and can provide the flexibility needed to easily change the shape of the seat pad for different types of seat assemblies. Of course, other types of polymeric materials may be molded to form the seat pad 16.

Disposed within the seat back 12 is an air bag assembly, such as a side air bag assembly 20. While the side air bag assembly 20 is shown on the seat back 12, which is a usage for which it has particular utility, it is also possible for the side air bag assembly to be utilized with a seat bottom even though the seat back usage is specifically disclosed. Also, as illustrated, the air bag assembly 20 is located at an outboard lateral side or extremity of the seat to provide protection against adjacent vehicle structure, but it is also possible to have the side air bag assembly located at the inboard lateral side to provide protection against an adjacent vehicle occupant and to also have side air bag assemblies at both outboard and inboard locations for protection in both lateral directions.

As shown in FIG. 2, the air bag assembly 20 includes an air bag 22 and an inflator 24, which is configured to supply inflation fluid such as gas to the air bag 22, thereby facilitating deployment of the air bag 22. In at least one embodiment, the air bag assembly 20 also includes a housing 40 which at least partially surrounds the air bag 22 and the inflator 24.

Also shown in FIG. 2 is a portion of a seat frame 26 which can be used for mounting the seat assembly 10 to a vehicle. The seat pad 16 is disposed proximate the frame 26 and air bag assembly 20 and may be directly attached to the frame 26 at various points. The trim cover 18 includes an air bag release seam 28 which in at least one embodiment is adjacent to a side 30 of the seat pad 16. In the embodiment shown in FIG. 4, the trim cover 18 includes end portions 31 and 33 that cooperate to form seam 28.

The air bag assembly 20 is located within the trim cover 18 and may be conventionally mounted, such as on the frame 26, adjacent the air bag release seam 28 but in a spaced relationship from the release seam. The schematically illustrated folded air bag 22, upon deployment, is inflated by inflation fluid from the inflator 24 to unfold and project outwardly from the seat 10 through the air bag release seam 28 of the trim cover 18 (FIG. 3).

With continuing reference to FIG. 2, an air bag guide of the seat back component is generally indicated by 32 and includes an inner panel 34 and an outer panel 36 that are each made of any suitable material effective to protect the seat pad 16 during deployment of the air bag 22. For example, a woven or non-woven cloth material, which may include natural or synthetic materials such as nylon. One material that is found to be effective is a polyester material, of the type from which the air bag 22 may be manufactured. Regardless of the type of material used to make the air bag guide 32, the use of the air bag guide 32 can be helpful in reducing friction on the air bag 22 as it deploys. Although a polymer such as nylon may be particularly beneficial, even a fleece material will help reduce the friction on the air bag 22. This is because the air bag guide 32 inhibits contact between the deploying air bag 22 and the seat pad 16 and helps to prevent small particles from separating from the seat pad and being introduced into the vehicle compartment.

The inner and outer panels 34, 36 of the air bag guide 32 respectively include inner extremities 42, 44 that can be attached suitably to the housing 40 and/or frame 26 to effectively associate the air bag guide 32 with the housing 40 of the air bag assembly 20. As shown in the embodiment illustrated in FIG. 2, the inner extremity 44 of the outer panel 36 is connected with the frame 26 and the inner extremity 42 of the inner panel 34 is connected with the housing 40 at 56.

As shown in FIG. 4, the inner and outer panels 34, 36 of the air bag guide 32 respectively include outer extremities 52, 54 attached to a retainer assembly 50 adjacent the seam 28. The outer extremities 52, 54 of inner and outer panels 34, 36 can be attached to the retainer assembly 50 by any suitable manner. For instance, the outer extremities 52, 54 can be attached to the retainer assembly 50 via stitching, ultrasonic welding, adhesive, etc., among other suitable manners. Also, in one embodiment, the retainer assembly 50 could be secured to the outer extremities 52, 54 of the air bag guide 32 via in situ molding of a polymeric seat pad 16. In this embodiment, the retainer assembly 50, already attached to the trim cover 18, and the guide 32 would both be suitably placed in the polymeric, such as polyurethane, mold so that the polymeric material used to form pad 16 could form around and secure the guide 32 to the retainer assembly 50. In at least this embodiment, the inner and outer 34 and 36 could have small openings, such as holes, that can allow relatively small amounts of polymeric material to extend between the panels. These relatively small amounts would not hinder deployment of the air bag 22.

In at least one embodiment, as shown in FIG. 4, the retainer assembly 50 comprises an inner retainer member 62, an outer retainer member 64, and a connector 66 for releasably securing the inner and outer retainer members 62 and 64 to each other. The inner and outer retainer members 62, 64 and the connector 66 can independently be made of any suitable relatively rigid material such as a rigid plastic such as nylon, PP (polypropylene), PE (polyethylene), and can be made by any suitable process such as injection molding and extrusion.

In the embodiment shown in FIG. 4, the inner retainer member 62 comprises a base portion 72 secured to the end portion 31 of trim cover 18 at location 58 in any suitable manner, such as by stitching, a downwardly depending body member 74, shown in FIG. 4 to have two axially spaced portions, and a leg portion 76 extending from the body portion 72 towards the outer retainer 64. In at least the embodiment illustrated in FIG. 4, the leg member 76 includes an opening 78.

In the embodiment shown in FIG. 4, the outer retainer member 64 comprises a base portion 82 secured to the end portion 33 of trim cover 18 in any suitable manner at 56, such as by stitching, a body portion 84 depending downwardly from the base portion 82 and secured with the outer extremity 52 of the inner panel 34 by any suitable means such as by stitching as shown at 86, and a leg member 88 depending from the body portion 84 towards the inner retainer member 62. In the embodiment illustrated in FIG. 4, the outer retainer member 64 includes an opening 90 located in the leg portion 88. Prior to deployment of the air bag 22, the leg portions 76 and 88 are located adjacent to each other such that the openings 78 and 90 are aligned with each other and are coaxial.

In the embodiment illustrated in FIG. 4, the connector 66 can be any suitable fastener such as a pin, rod, or velcro fastener for releasably securing the inner retainer 62 with the outer retainer 64. In the embodiment illustrated in FIG. 4, the connector 66 is suitably secured with the outer extremity 54 of the outer panel 36 via any suitable means such as stitching 94. It should be understood that while stitching has been shown schematically in the figures, notably at locations 56, 58, 86, and 94, other suitable conventional connection methods, such as adhesive and/or ultrasonic welding, can be used instead of or in combination with stitching.

In at least one embodiment, the air bag guide 32 is effective to prohibit all contact between the deploying air bag 22 and the seat pad 16. This can help to prevent energy loss from the air bag 22 by decreasing friction and protecting the seat pad 16 from damage. This, in turn, can also help to reduce the deployment time for the air bag 22 and/or the amount of inflation fluid required to deploy the air bag.

In at least one embodiment, the inner and outer panels 34 and 36 of the air bag guide 32 form a deployment channel 38 for the air bag 22. As shown in FIGS. 2-4, the deployment channel 38 is oriented to facilitate deployment of the air bag 22 through the seam 28 in the trim cover 18.

Upon deployment of the air bag assembly 20, as shown schematically in FIG. 3, the deploying air bag 22 causes relative movement of the flexible inner and outer panels 34 and 36 away from each other which then provide a guiding function of the unfolding air bag 22 as it moves between the panels toward the air bag release seam 28 and eventually tears open the release seam for outward projection of the air bag to provide the occupant protection. Furthermore, as the air bag 22 deploys through the deployment channel 38, the air bag guide 32 acts as a blocking member that forms a barrier on two sides 39, 41 of the air bag 22, thereby inhibiting contact between the air bag 22 and the seat pad 16. Thus, the seat pad 16 is moved away from the air bag 22 as it deploys through the deployment channel 38.

The inflation of the air bag 22 causes relative movement of the inner and outer panels 34, 36 from each other causing the connector 66 to become disengaged from the retainers 62 and 64 thereby allowing the retainers 62 and 64 and thus the ends 31, 33 of the trim cover 18 to separate to enable the tear seam 28 to move from a first, generally closed position, to a second, open position, as shown in FIG. 3, to enable the air bag to deploy outward of the seat assembly 10. As shown in FIGS. 3-4, the attachment of the outer extremities 52, 54 to the inner and outer retainer members 62 and 64, respectively of the retainer assembly 50 adjacent the seam 28 helps to facilitate deployment of the air bag 22 through the seam 28. This is because the deployment channel 38 opens as the air bag 22 is deployed, and this causes the connector 66 to rupture and/or the legs 76 and 88 to rupture, and/or the connector 66 to disengage from legs 76 and 88, adjacent the seam 28 directing the deploying air bag 22 to exert an outward force on the trim cover 18 at the seam 28; this helps to open the seam 28 to provide an easy exit for the air bag 22. Also, retainer assembly 50 helps to ensure that the air bag 22 will deploy in the predetermined described manner through seam 28. Because of retainer assemblies 50 relatively consistent manufacturing process, use of retainer assembly 50 can help ensure relatively consistent deployment of air bag in seat assemblies 10 employing the use of retainer assembly 50.

Figure 5:
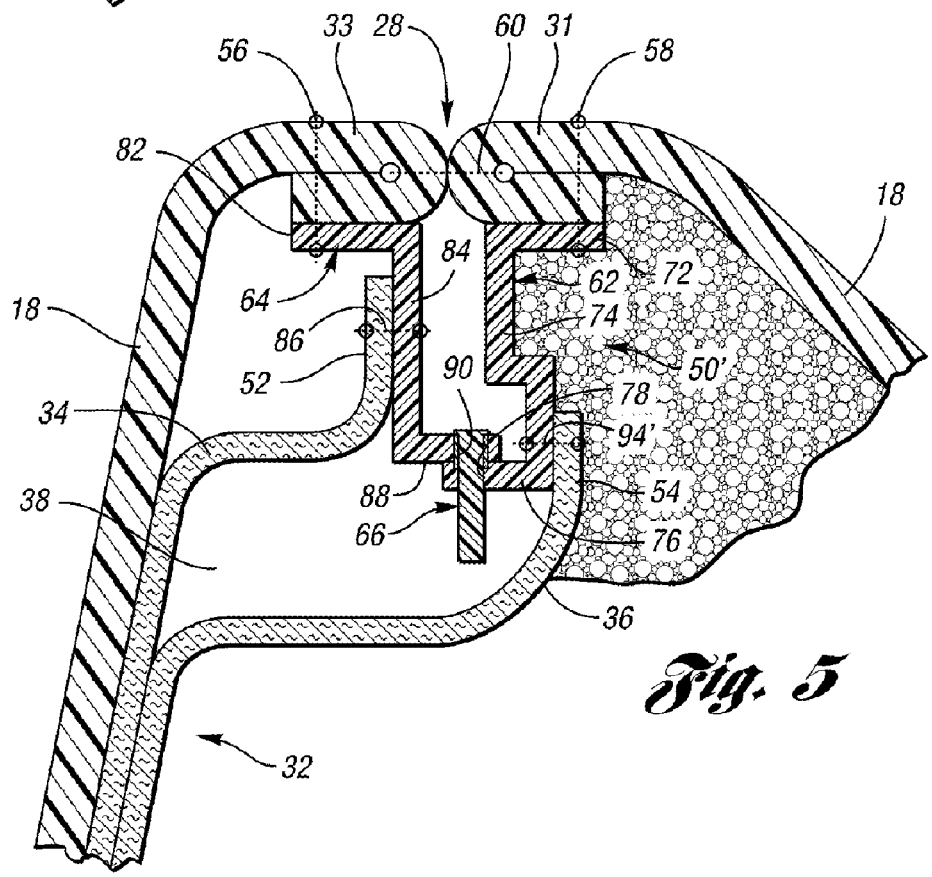
FIG. 5 is similar to FIG. 4 showing a different embodiment.

FIG. 5 illustrates a second embodiment of the retainer assembly 50'. The retainer assembly 50' is essentially similar in construction and operation to the retainer assembly 50 shown in FIG. 4 except that the outer extremity 54 of the inner panel 36 is attached to the body 74 of the inner retainer member 62 via suitable means such as stitching shown schematically at 94'.

As shown in FIG. 4, the seam 28 can be sewn, or otherwise attached, at locations 56, 58, where the sides 62, 64 of the connector 50 are connected with end portions of the trim cover 18. This helps to transfer the force from the air bag guide 32, and facilitates separation of the seam 28. As shown in the embodiment illustrated in FIG. 4, the seam 28 can also be optionally sewn, or the ends of the cover be otherwise attached, at location 60.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly, comprising:
a frame;
a seat pad adjacent the frame;
a trim cover extending over the seat pad and including a first and second ends adjacent each other to form an airbag release seam adjacent the seat pad;
an air bag assembly mounted on the frame within the trim cover in a spaced relationship from the air bag release seam, the air bag assembly including an inflator and a folded air bag that is inflated by the inflator to unfold and project outwardly from the seat through the air bag release seam of the trim cover;
an air bag guide including an inner panel and an outer panel that are each made of flexible material and have outer extremities;
a first member extending between and connecting the first end of the trim cover and the outer extremity of the inner panel;
a second member connecting the second end of the trim cover and the outer extremity of the outer panel; and
a connector engaged with and connecting the first member with the second member, wherein at least one of the first member, the second member and the connector is made of a rigid material.

2. The vehicle seat assembly of claim 1, wherein the first member, the second member, and the connector are made of rigid plastic.

3. The vehicle seat assembly of claim 1, wherein the first member has a first opening, the second member has a second opening, and the connector extends through the first and second openings.

4. The vehicle seat assembly of claim 3, wherein the connector is connected to the outer panel.

5. The vehicle seat assembly of claim 4, wherein the first member has a first leg extending towards the second member and the second member has a second leg extending towards the first member, the first opening being in the first leg and the second opening being in the second leg, the first and second legs being adjacent each other such that the first and second openings are coaxial, and the connector comprising a pin.

6. The vehicle seat assembly of claim 5, wherein the connector disengages from the first and second members upon deployment of the air bags.

7. The vehicle seat assembly of claim 4, wherein stitching connects the first member to the inner panel and the connector to the outer panel.

8. The vehicle seat assembly of claim 1, wherein the second member is connected to the outer panel by stitching and stitching connects the first member to the inner panel.

9. A vehicle seat assembly, comprising:
a frame;
a seat pad adjacent the frame;
a trim cover extending over the seat pad and including a release seam adjacent the seat pad;
an air bag assembly within the trim cover in a spaced relationship from its air bag release seam, the air bag assembly including an inflator and a folded air bag that is inflated by the inflator to unfold and project outwardly from the seat through the air bag release seam of the trim cover;
an air bag guide including an inner panel and an outer panel;
a first member connecting the trim cover with the inner panel;
a second member connecting the trim cover with the outer panel; and
a connector connecting the first member with the second member, wherein stitching extends between and connects at least one of the first and second members to the outer panel.

10. The vehicle seat assembly of claim 9, wherein the first member, the second member, and the connector are made of rigid plastic.

11. The vehicle seat assembly of claim 10, wherein the first member has a first opening, the second member has a second opening, and the connector extends through the first and second openings.

12. The vehicle seat assembly of claim 9, wherein the connector is connected to the outer panel.

13. The vehicle seat assembly of claim 11, wherein the first member has a first leg extending towards the second member and the second member has a second leg extending towards the first member, the first opening being in the first leg and the second opening being in the second leg, the first and second legs being adjacent each other and coaxial.

14. The vehicle seat assembly of claim 12, wherein stitching connects the first member to the inner panel and the connector to the outer panel.

15. The vehicle seat assembly of claim 9, wherein the second member is connected to the outer panel by stitching and stitching connects the first member to the inner panel.

16. The vehicle seat assembly of claim 9, wherein the first member and the second member have portions connected to the inner surface of the trim cover adjacent the release seam.

17. A vehicle seat assembly, comprising:
a frame;
a seat pad mounted on the frame;
a trim cover extending over the seat pad and including a release seam adjacent the seat pad, the release seam being formed by a first and a second end of the trim cover;
an air bag assembly mounted on the frame within the trim, the air bag assembly including an inflator and an air bag that is inflated by the inflator to project outwardly from the seat through the air bag release seam of the trim cover;
an air bag guide including a first panel and a second panel, each panel being made of flexible material;
a rigid first plastic member extending between and connecting the first end of the trim cover and the first panel;
a rigid second plastic member connected to the second end of the trim cover; and
a rigid plastic connector pin extending between and connecting the first member and the second member.

18. The vehicle seat assembly of claim 17, wherein stitching connects the first member to the inner panel and the connector to the outer panel.

19. The vehicle seat assembly of claim 18, wherein the first member has a first opening, the second member has a second opening, and the connector pin extends through the first and second openings.

20. The vehicle seat assembly of claim 19, wherein the first member has a first leg extending towards the second member and the second member has a second leg extending towards the first member, the first opening being in the first leg and the second opening being in the second leg, the first and second legs being adjacent each other and coaxial.

* * * * *